March 19, 1940.  J. D. CUMMINGS  2,194,268
PIPE COATING DEVICE
Filed Oct. 11, 1938   3 Sheets-Sheet 1

INVENTOR.
JAMES D. CUMMINGS
BY Jesse R. Stone
Lester B. Clark
ATTORNEYS

March 19, 1940.  J. D. CUMMINGS  2,194,268
PIPE COATING DEVICE
Filed Oct. 11, 1938   3 Sheets-Sheet 2

INVENTOR.
JAMES D. CUMMINGS
BY
ATTORNEYS

March 19, 1940. J. D. CUMMINGS 2,194,268
PIPE COATING DEVICE
Filed Oct. 11, 1938 3 Sheets-Sheet 3

INVENTOR.
JAMES D. CUMMINGS
BY Jesse R. Stone
Lester B. Clark
ATTORNEYS

Patented Mar. 19, 1940

2,194,268

UNITED STATES PATENT OFFICE 2,194,268

PIPE COATING DEVICE

James D. Cummings, Houston, Tex., assignor to Gardiner Coating Machine Company, Inc., a corporation of New York Application October 11, 1938, Serial No. 234,425

12 Claims. (Cl. 91—30)

My invention relates to apparatus for coating pipe. It is particularly adapted for coating pipe employed in pipe lines for conducting fluids for some distance.

Pipe thus coated is usually laid along the side of the ditch into which it is to be sunk and there welded together into one continuous line of pipe. Before it is laid in the ditch after welding it is cleaned and coated and may also be subsequently wrapped with a wrapping of paper, felt, or the like.

This invention is an improvement upon the type of pipe coating device disclosed in the prior patent to Gardner, No. 1,839,937, granted June 10, 1933. In prior devices it has been common to provide a container through which the pipe may pass, said container being filled with coating material, thus allowing the pipe to be submerged in the coating material. Such coating material may be asphaltic compounds or especially prepared paint which is particularly resistant to oxidation, corrosion, and the like. Such materials may be hard at atmospheric temperatures but melt when the temperature has been raised a material extent to facilitate application or they may be of the type which do not require heating.

I have as an object to provide means to maintain the coating material at a desired temperature where it is quite fluid so that it may be spread upon the pipe evenly, and to provide spreading devices in connection therewith which maintain a smooth and even coating on said pipe.

It is a further object of the invention to provide an effective means for maintaining the spreading devices in a position uniformly spaced away from the pipe but allowing the same to be moved to pass over welds or other uneven portions of the pipe.

It is a further object of the invention to provide a mechanically operated device of this character wherein the pipe may be rapidly coated but in which little waste of material is allowed.

The invention resides particularly in the arrangement and construction of the parts making up the device and reference is made to the drawings herewith wherein such structure is more fully illustrated.

In the drawings, Fig. 1 is a side view largely in elevation but with parts broken away to show the structure of the invention.

Figure 1:
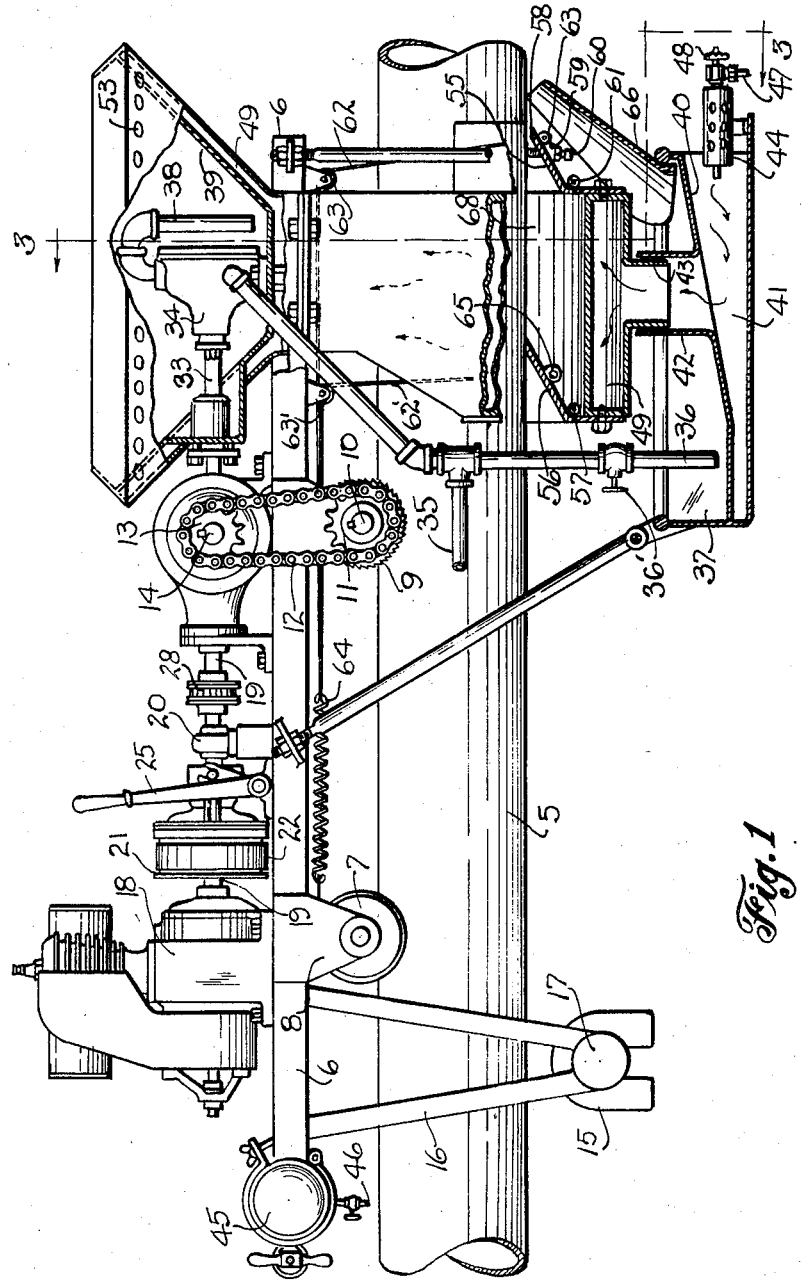
Figure 2:
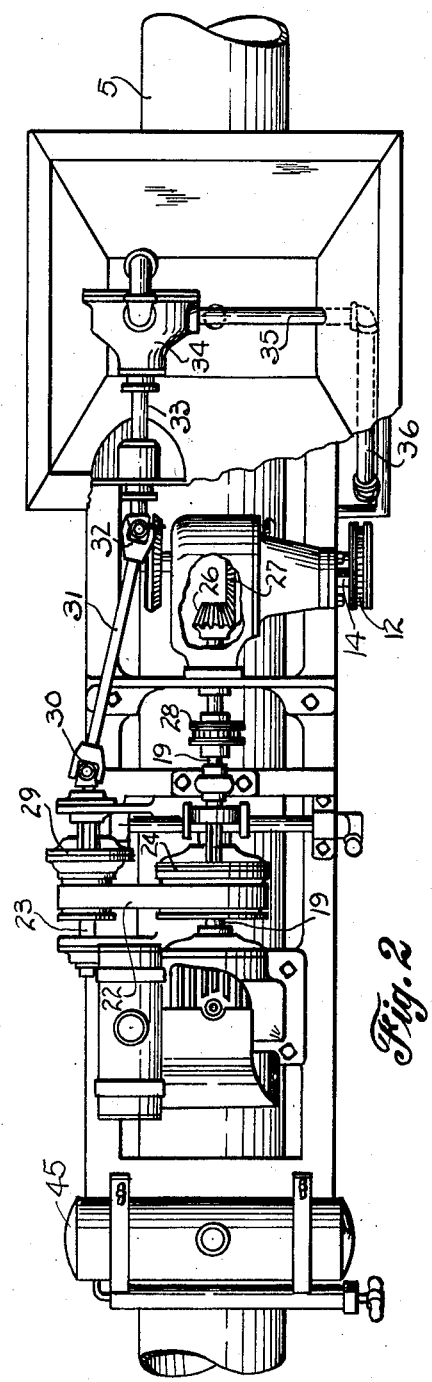
Fig. 2 is a top plan view with parts broken away for greater clearness.

My device is constructed to be mounted over the pipe in such a way that relative movement can take place between the pipe and the device. I provide means for mechanically causing such movement to take place and simultaneously delivering the coating material to the pipe as the pipe moves through the apparatus. With reference particularly to Fig. 1, the pipe is shown at 5. The apparatus is mounted upon a frame 6 approximately rectangular in shape and supported in spaced relation above the pipe by wheels or rollers 7 mounted toward the forward end of the frame upon downwardly extending plates 8, one on each side of the frame.

There is a second set of rollers which are employed also as traction wheels, these wheels being spaced toward the rearward end of the frame as the frame travels along the pipe and are shown at 9. As will be seen from Fig. 3, the traction wheels 9 are formed with teeth on the side toward the pipe to engage and propel the frame during the operation of the apparatus. The two wheels 9 are mounted upon a shaft 10, which has a sprocket wheel 11 at one end thereof for engagement with a sprocket chain 12, driven from a sprocket wheel 13 mounted on the shaft 14, which is mechanically driven as will be later noted.

Toward the forward end of the frame I may suspend a number of weights 15 by hangers 16, it being understood that the hangers at each side of the frame carry a cross arm 17, upon which the desired number of weights may be hung to balance the frame properly during its operation.

The apparatus is operated through any desired source of power and I have shown an internal combustion motor 18 mounted toward the forward end of the frame. Said motor is operatively connected for driving the shaft 19 which is mounted in bearings 20 on the frame. Mounted on the shaft 19 is a pulley 21, which is connected by means of the belt 22 to a pump drive shaft 23. The pulley 21 may be clutched to the shaft 19 by means of the friction clutch 24 operated through the hand lever 25.

The shaft 19 is formed with a bevel gear 26 thereon which engages with the gear 27 on a shaft 14, previously mentioned. Through this driving connection the traction wheels are rotated to propel the device along the pipe. The universal joint 28 is provided to take up for lateral strains which may be placed upon the drive shaft.

The pump shaft 23 previously noted is rotated by the belt connection 22 through a friction clutch 29. A universal joint at 30 connects the shaft 23 with the shaft 31, which is connected through the universal joint 22 with the shaft 33 of the rotary pump mounted within the housing 34.

The housing 34 Fig. 1 is provided with an intake pipe 35 which leads to a tar pot or supply of coating material. One branch 36 of this pipe has its lower end projecting into the sump or container 37 at a point below the pipe to be coated so that any waste material dripping into the sump may be returned to be used by opening the valve 36' on this branch. The outlet pipe 38 from the pump discharges into an upper reservoir or tank 39, which contains the pipe coating material so that the material will flow by gravity down onto the pipe.

The sump 37 has a bottom wall 40 inclined upwardly toward the rear. Beneath said wall is a heating chamber 41. An upwardly extending flue 42 from the heating chamber telescopes over a downwardly extending nipple or pipe 43 leading to a passage 49. The chamber 41 is open at its forward end to receive a fuel burner 44. Said fuel burner may be of any desired construction for the burning of liquid or gaseous fuel.

I have shown at the forward end of the frame a container 45 for liquid fuel, there being an outlet pipe 46 on the lower side of the same which is connected by a flexible line, not shown, with the pipe 47 at the forward end of the burner 44. Thus fuel may be fed to the burner which may be adjusted by means of the handle 48.

Figure 3:
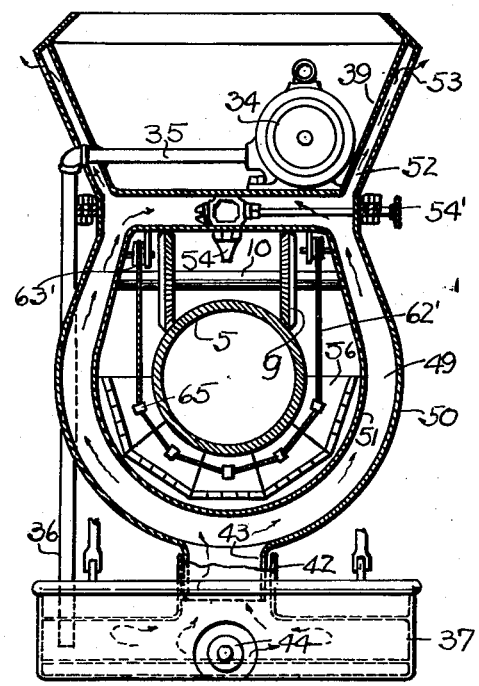
Fig. 3 is a vertical section approximately on the plane 3—3 of Fig. 1.
Figure 4:
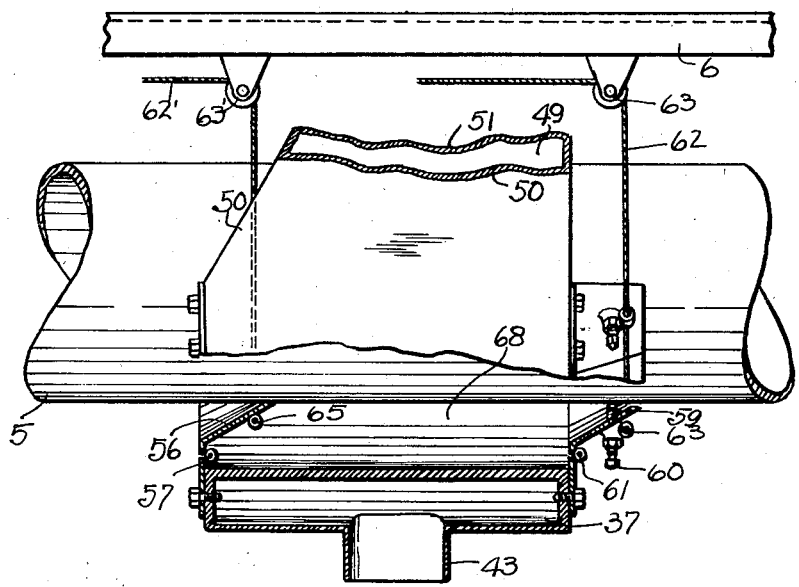
Fig. 4 is a side view of the coating device with parts broken away to illustrate the heating and spreading apparatus.

With reference particularly to Fig. 3, it will be seen that the pipe 43 which receives the heated air from the burner is connected with passage 49 formed between the outer wall 50 and the inner wall 51 spaced from the spreader device. It will be noted that the passage 49 allows the heat from the burner to pass upwardly around the spreader and into the chamber 52 around the outer portion of the reservoir 39 and outwardly through openings 53 in the wall 50. In this manner the heat is applied to the lower sump and into the space below and around the reservoir 39, so that the material in the reservoir 39, employed to coat the pipe is kept at the desired temperature.

Fluid from the reservoir 39 may be fed downwardly from said reservoir entirely by gravity through a nozzle 54 onto the upper surface of the pipe 5 at a point spaced rearwardly from the driving wheels. Thus the feed of the coating material is controlled as to quantity by the valve 54' at the nozzle, thus making it possible for the operator to vary the amount of coating material as desired. Such coating material will before congealing run down in a smooth uniform coating over the upper side of the pipe and into the spreading apparatus on the lower side thereof.

This apparatus comprises forward and rearward frusto-conical shaped members 55 and 56, respectively. The forward members 56 are made of a plurality of plates which are hinged at 57 and at their rearward ends are curved to conform with the curvature of the pipe and to bear against the same when the device is propelled along the pipe. As will be seen from Fig. 1 they serve to prevent the flow of material from the chamber 49 below the pipe toward the forward portion of the machine.

The spreading members 55 are relied upon to spread the coating material evenly upon the pipe and the rearward ends 58 of these spreaders are spaced evenly from the pipe by an adjustable screw 59 which extends through each plate so that the end of said screw may bear against the pipe, the outer end 60 being squared to receive a wrench whereby the said spacer may be adjusted.

The plates 55 are hinged at 61 to the wall of the chamber 49 and are held resiliently against the pipe by means of cable 62, which extends around the pipe and through eyelets 63 in the plates 55. The cables 62 are extended over pulleys 63 supported in the frame 6 and then are extended rearwardly and secured to springs 64, which are connected at their forward ends to the plates 8. There is a similar cable 62' connected to a spring 64 and extended around the plates 56 and through eyelets 65 thereon and upwardly on the opposite side and over pulleys 63' to springs upon the opposite side. This will be understood somewhat from Fig. 3.

Below the spreader plates 55 is a drip guard 66 which is mounted below the spreader plates 55 and the forward spreading edge 58 thereof to receive coating material which may escape around the said plate 55 and to return the same back into the lower sump 37.

The operation of this construction will be apparent from the description already given. The motor may be employed to rotate the traction wheels 9 so that the apparatus will be moved at a uniform speed along the pipe. While the machine is thus progressing the coating material within the reservoir 39 will be fed downwardly through the nozzle 54 through the manipulation of the valve 54' to deliver the coating material upon the pipe in the desired quantity. Said material is kept in condition so that it will flow evenly over the pipe and downwardly into the chamber 68 below the pipe. The chamber 68 will be partially filled with the material so that the lower side of the pipe will be in contact with the liquid coating material. Said material will tend to pour out over the spreader plates 55 at the rearward side of the machine and will be spread thereon in a uniform thickness depending upon the space between the ends 58 of the spreader plates and the pipe. This thickness may be adjusted as previously noted by the adjusting screws 60. These adjusting screws will therefore not only serve to regulate the thickness of the coating but they will serve as a guard for the spreading ends of the plates 55 when projectons in the pipe are encountered, as when the device passes over a weld thereon.

The manner in which the plates are held resiliently against the pipe through the cables 62 and 62' and the springs 64 is found to be particularly efficient and economical to employ. It prevents the necessity of separate resilient mountings for each of the plates, thus making the machine economical in construction.

The arrangement whereby the coating material may be spread copiously over the pipe and kept at a uniform temperature is also found to be particularly effective. When the material is of the proper temperature it will spread over the upper surface of the pipe without the necessity of special wipers or spreaders. Spreading devices can be arranged as desired completely around the pipe or only around the lower half thereof. This also results in a material reduction in the amount of apparatus required. By pumping the otherwise waste material back up into the reservoir 39 there is little actual waste of material.

The combination is simple and economically constructed.

While I have described my machine primarily in the form in which the apparatus moves along the pipe, it is to be understood that the important fact is that relative movement will take place between the pipe and the apparatus, and it is clear that my apparatus can be employed where it remains stationary and the pipe passes through it.

What is claimed is:

1. A pipe coating device including a frame, means to support said frame upon the pipe, means to propel said frame along the pipe, a reservoir for coating material above said pipe so that the material may flow by gravity about the pipe, a sump for coating material below said pipe, means to heat said sump and said reservoir, said reservoir having a valve controlled outlet to discharge material by gravity therefrom upon the upper side of said pipe, means along the lower side of said pipe to spread a uniform coating of said material upon the lower portion of said pipe responsive to the movement of said device along said pipe, and a pump to move excess coating material from said sump to said reservoir.

2. A pipe coating device including a frame, rollers on said frame to support said frame upon said pipe, a reservoir for coating material on said frame above said pipe, there being an outlet from said reservoir to discharge a desired volume of said coating material by gravity from said reservoir upon said pipe, a sump below said pipe to receive coating material dripping from said pipe, means to heat said sump and said reservoir, means to pump excess material from said sump to said reservoir, means to drive said pumping means, and rotate certain of said rollers to propel said frame along said pipe, and means mounted on said heating means to spread said coating material along the lower portion of said pipe.

3. In a pipe coating device supported upon and adapted to be propelled along a pipe, a reservoir for coating material above said pipe, a sump for coating material below said pipe, a heating chamber below said sump, a heater therein, passages from said heating chamber upwardly to said reservoir to form a wall for said chamber and to conduct heat from said heater to said reservoir, a pump to deliver coating material to said reservoir, means to deliver coating material from said reservoir upon said pipe, and a plurality of spreader plates mounted upon said passages around the lower side of said pipe, manually adjustable toward and away from said pipe to spread a uniform coating of said material upon said pipe.

4. In a pipe coating device supported upon and adapted to be propelled along a pipe, a reservoir for coating material above said pipe, a sump for coating material below said pipe, a heating chamber below said sump, a heater therein, passages from said heating chamber upwardly to said reservoir to conduct heat from said heater to said reservoir, means to deliver coating material to said reservoir, a chamber below said pipe to receive coating material from said reservoir, means to deliver a uniform volume of coating material from said reservoir upon said pipe and into said chamber, means to close the forward end of said chamber about said pipe, spreader plates at the rearward end of said chamber, means to space the outer edges of said spreader plates from said pipe, a cable connected with each of said spreader plates, and means to exert a tension upon said cable to hold said plates toward said pipe.

5. In a pipe coating machine, a reservoir for coating material above said pipe, means to deliver a uniform stream of coating material by gravity from said reservoir upon the upper surface of said pipe, a chamber below said pipe to receive said material, spreader plates at the rearward end of said chamber, some of said plates being hinged to said chamber, the free ends of some of said plates being arcuate to fit about said pipe, set screws adjustable through some of said plates to engage said pipe and space said plates therefrom, and means to hold said plates resiliently toward said pipe.

6. In a pipe coating machine, a reservoir for coating material above said pipe, means to deliver a uniform stream of coating material by gravity from said reservoir upon the upper surface of said pipe, a chamber below said pipe to receive said material, spreader plates at the rearward end of said chamber, said plates being inclined rearwardly and adapted to fit about said pipe, means adjustable through said plates to space the edges thereof the desired distance from said pipe, and a single flexible line passing around said plates and means to exert a tension on said line to hold said plates resiliently toward said pipe.

7. In a pipe coating device, a reservoir for coating material above the pipe, a chamber for coating material below said pipe, means to deliver coating material from said reservoir onto said pipe and into said chamber, means at the rearward end of said chamber to spread a uniform coat of said material around the lower side of said pipe, a sump below said chamber, a heater below said sump, a passage for the heated air from said heater around the sides of said chamber, said pipe and said reservoir, and means to pump coating material from said sump to said reservoir.

8. In a pipe coating device, a reservoir for coating material above the pipe, a chamber for coating material below said pipe, means to deliver coating material from said reservoir onto said pipe and into said chamber, means at the rearward end of said chamber to spread a uniform coat of said material around the lower side of said pipe, a sump below said chamber, and means to heat said sump, said chamber and said reservoir to maintain said coating material at a uniform temperature.

9. In a pipe coating device, a reservoir for coating material above the pipe, a chamber for coating material below said pipe, means to deliver coating material from said reservoir onto said pipe to drip by gravity into said chamber, means to traverse said reservoir along the pipe, spreader plates on said chamber hinged thereto and inclined rearwardly therefrom, set screws extending through some of said plates to bear against said pipe, eyelets on the outer faces of said plates; and means extending through said eyelets to exert a resilient tension on said plates to hold said set screws against said pipe.

10. In a pipe coating machine, a plurality of movable spreader plates positioned below and around said pipe and adapted to receive coating material, a support to which said plates are hinged at one of their ends, a flexible line passing about said plates, and means to exert a tension on said line to hold said hinged end plates resiliently against said pipe.

11. In a pipe coating machine, a chamber for the coating material adjacent said pipe, spreader plates having one end thereof hinged to said chamber, eyelets on the outer surfaces of said plates, a flexible line extending through said eyelets, and means to resiliently tighten said line about said pipe to hold said plates in adjusted position adjacent thereto.

12. A pipe coating device including a frame, means to support said frame upon the pipe for movement therealong, a reservoir for coating material above the pipe, means to discharge the material by gravity to flow onto the top of the pipe, means about the lower portion of the pipe to receive the material flowing down around the pipe and to cause the material to remain in contact with the pipe as the device moves along the pipe, a sump to receive the excess material, a pump to transfer coating material from the sump to the reservoir, and means on the device to heat said reservoir and said sump so that coating material will flow by gravity, and be transferred by said pump.

JAMES D. CUMMINGS.